United States Patent
Lee et al.

(10) Patent No.: US 11,285,855 B2
(45) Date of Patent: Mar. 29, 2022

(54) SIDE BOLSTER ADJUSTMENT APPARATUS, SIDE BOLSTER ADJUSTMENT SYSTEM, AND SIDE BOLSTER ADJUSTMENT METHOD FOR VEHICLE SEAT

(71) Applicants: Hyundai Motor Company, Seoul (KR); Kia Motors Corporation, Seoul (KR); Hyundai Transys Inc., Seosan-si (KR)

(72) Inventors: Sang-Hark Lee, Incheon (KR); Tae-Hoon Lee, Suwon-Si (KR); Ji-Hwan Kim, Seoul (KR); Sang-Do Park, Suwon-Si (KR); Ho-Sub Lim, Seoul (KR)

(73) Assignees: Hyundai Motor Company, Seoul (KR); Kia Motors Corporation, Seoul (KR); Hyundai Transys Inc., Seosan-si (KR)

( * ) Notice: Subject to any disclaimer, the term of this patent is extended or adjusted under 35 U.S.C. 154(b) by 0 days.

(21) Appl. No.: 16/892,188

(22) Filed: Jun. 3, 2020

(65) Prior Publication Data
US 2021/0245642 A1  Aug. 12, 2021

(30) Foreign Application Priority Data
Feb. 7, 2020  (KR) .......... 10-2020-0014628

(51) Int. Cl.
*B60N 2/90* (2018.01)
*B60N 2/23* (2006.01)
*B60N 2/02* (2006.01)

(52) U.S. Cl.
CPC .......... *B60N 2/99* (2018.02); *B60N 2/0232* (2013.01); *B60N 2/233* (2013.01); *B60N 2002/0236* (2013.01)

(58) Field of Classification Search
CPC ........ B60N 2/99; B60N 2/986; B60N 2/0232; B60N 2/0224; B60N 2/233; B60N 2/23;
(Continued)

(56) References Cited

U.S. PATENT DOCUMENTS 4,804,221 A * 2/1989 Saiki .......... B62J 1/10
297/243
10,814,753 B2 * 10/2020 Eichhorn .......... B60N 2/99
(Continued)

FOREIGN PATENT DOCUMENTS

KR  10-1598960 B1  3/2016
KR  10-1690043 B1  12/2016
(Continued)

*Primary Examiner* — Mark R Wendell
(74) *Attorney, Agent, or Firm* — Morgan, Lewis & Bockius LLP

(57) ABSTRACT

A side bolster adjustment apparatus of a vehicle seat may include a guide frame which is mounted to a seat back frame, and is formed with a guide groove; a slider which slides along a direction in which a bolster protrudes from a seat back, which is the longitudinal direction of the guide groove, by a guide means formed in the guide groove; a lead screw which is provided to penetrate the slider, and is mounted in the longitudinal direction of the guide groove; a motor which is coupled to the lead screw and selectively rotate the lead screw; and a bolster plate which is coupled to the slider, and rotates around a vertical longitudinal direction of the seat back by operation of the slider.

15 Claims, 18 Drawing Sheets

(58) Field of Classification Search
CPC .. B60N 2/66; B60N 2/929; B60N 2002/0236; B60N 2002/024
USPC ............................... 297/284.9, 284.4, 284.7
See application file for complete search history.

(56) References Cited

U.S. PATENT DOCUMENTS

| | | | |
|---|---|---|---|
| 2008/0061613 A1* | 3/2008 | Anikin ................ | B60N 2/0276 297/284.9 |
| 2008/0073959 A1* | 3/2008 | Anikin ................ | B60N 2/0276 297/284.9 |
| 2014/0125102 A1* | 5/2014 | McMillen ............. | B60N 2/02 297/284.4 |
| 2018/0154812 A1* | 6/2018 | McMillen ............. | B60N 2/22 |
| 2019/0315257 A1* | 10/2019 | Caruss ................. | B60N 2/99 |
| 2019/0344692 A1 | 11/2019 | Eichhorn et al. | |

FOREIGN PATENT DOCUMENTS

| | | |
|---|---|---|
| KR | 10-1705668 B1 | 2/2017 |
| WO | WO 02/092385 A1 | 11/2002 |
| WO | WO 2018/060219 A1 | 4/2018 |

* cited by examiner

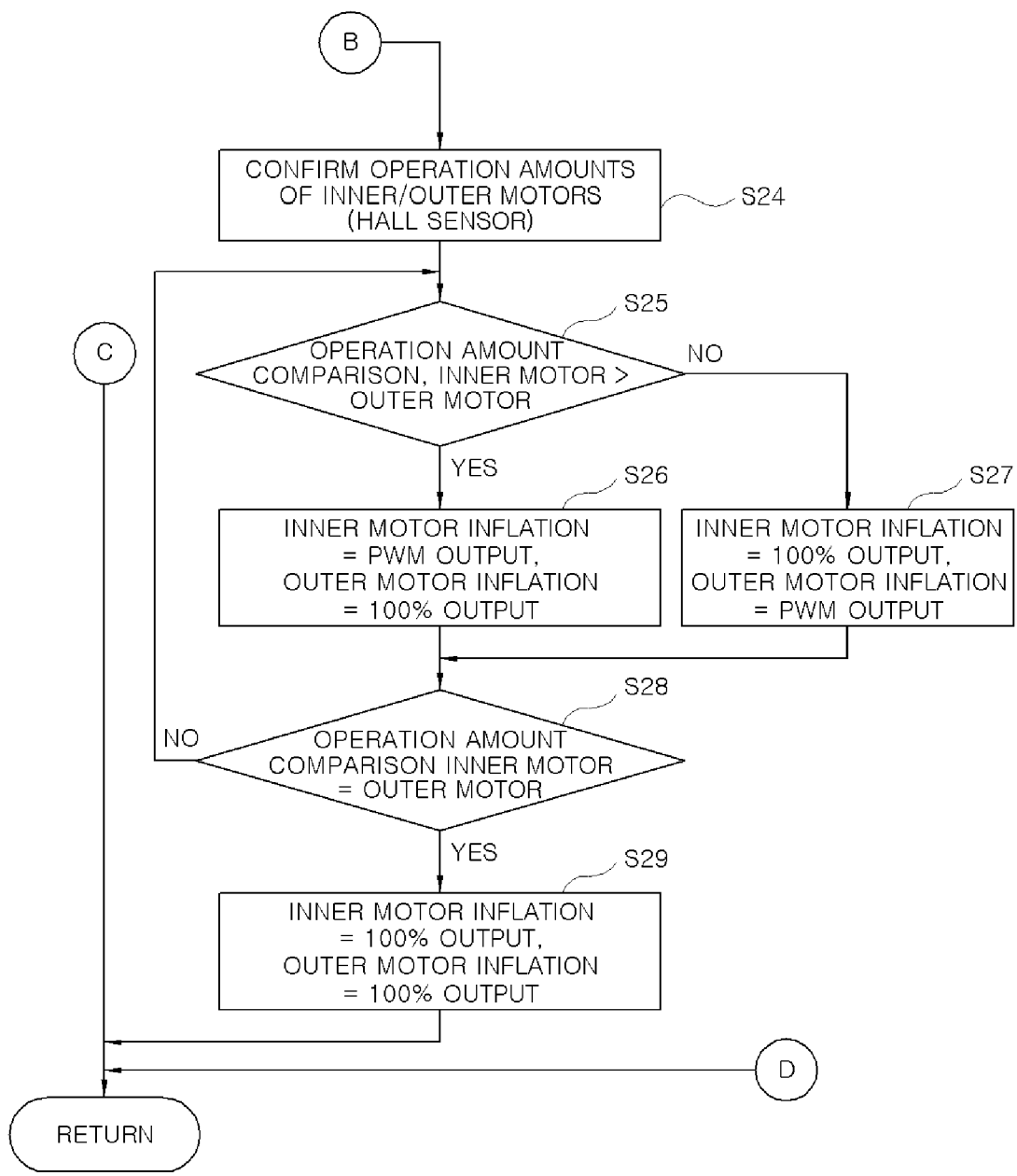

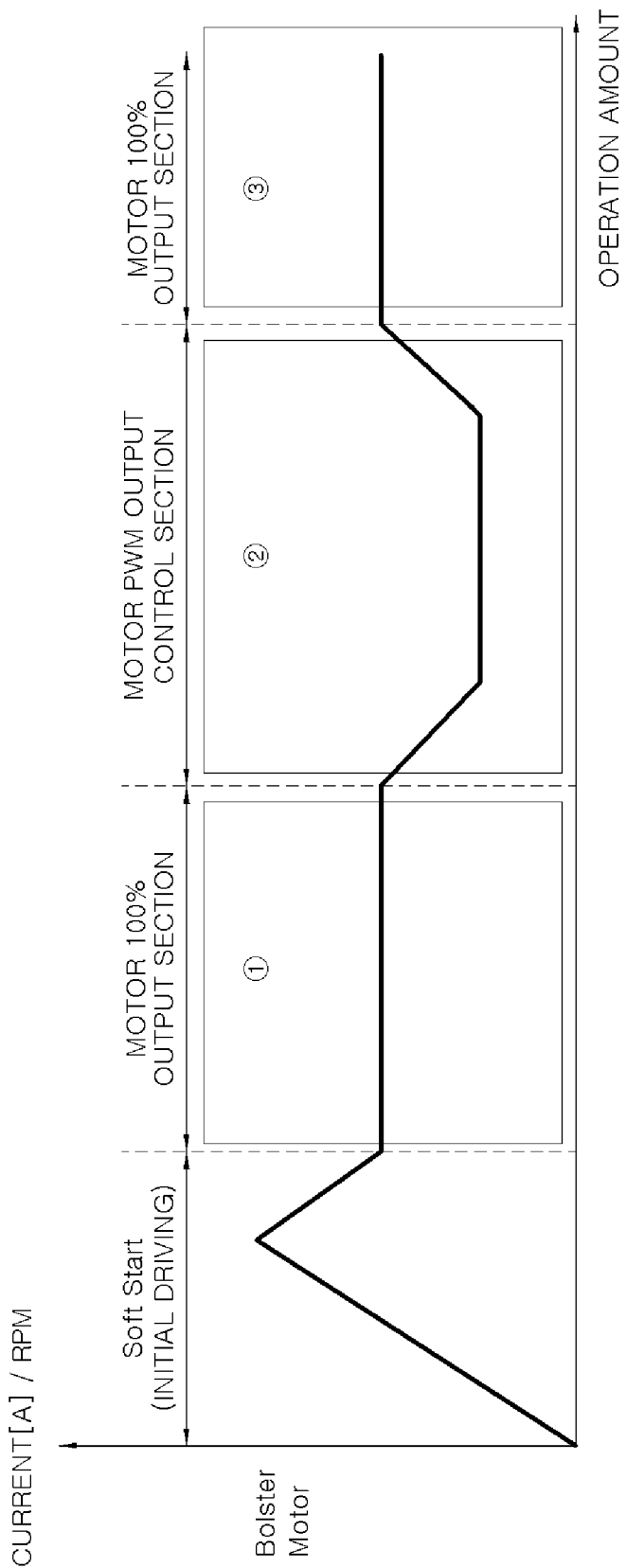

SIDE BOLSTER ADJUSTMENT APPARATUS, SIDE BOLSTER ADJUSTMENT SYSTEM, AND SIDE BOLSTER ADJUSTMENT METHOD FOR VEHICLE SEAT

CROSS-REFERENCE TO RELATED APPLICATION

The present application claims priority to Korean Patent Application No. 10-2020-0014628, filed on Feb. 7, 2020, the entire contents of which is incorporated herein for all purposes by this reference.

BACKGROUND OF THE INVENTION

Field of the Invention

The present invention relates to an apparatus which adjusts a side bolster provided in a vehicle seat, a system including the same, and a method of adjusting the side bolster.

Description of Related Art

A side bolster of a vehicle seat refers to a portion which is formed to protrude from both front side portions of a seat back forward to support by surrounding passenger's back and waist portions.

There occurs the phenomenon in which the passenger accommodated on the seat is pushed out by the centrifugal force when the vehicle turns, and the side bolster supports the upper body of the passenger to prevent such a phenomenon.

The side bolster has a fixed type, but recently, an adjustable type which may improve the side support for the passenger and comfort during seating by adjusting both front side portions of the seat back to protrude forward is being developed and applied.

Such an adjustable side bolster includes a mechanical apparatus using a motor and a link and a hydraulic apparatus using an air cell and a pneumatic valve.

FIG. 1 illustrates an example of a hydraulic bolster apparatus, and FIG. 2 schematically illustrates a planar cross-sectional shape.

Referring to FIG. 1 and FIG. 2, the bolster apparatus of FIG. 1 has a method which injects air which is supplied from a pneumatic pump to an air cell 13 through an air hose 12 under control of a controller 11 including a valve and a pressure sensor, such that the air cell 13 whose volume is changed presses a bolster adjustment plate 14 which supports the bolster, adjusting the width and the height of the interior of the bolster.

Such a hydraulic bolster apparatus has the limitation in that the universality in applying a technology is degraded due to excessive costs.

Furthermore, FIG. 3 illustrates an example of a mechanical bolster apparatus, and FIG. 4 illustrates an enlarged diagram of some components.

Referring to FIG. 3 and FIG. 4, the bolster apparatus of FIG. 3 has a method which rotates a bolster adjustment plate 23 by adjusting the length of a wire 22 by the operation of a motor 21 which is mounted to a seat back frame 30, adjusting the width and the height of the interior of the bolster.

Such a mechanical bolster apparatus saves the costs as compared to the hydraulic type.

However, the hydraulic and mechanical bolsters described above have a problem about the deviation between the operation amounts of the internal and external bolsters.

That is, the hydraulic bolster apparatus injects air into the internal and external air cells 13 by one pump as the actuator, and the mechanical bolster apparatus simultaneously adjusts the internal and external bolsters by one motor as the actuator, and accordingly, there may occur the deviation between the operation amounts of the internal and external bolsters based on the difference between the structures of the internal and external bolsters and the passenger's conditions.

That is, there may occur problems in that the locations between the internal and external bolsters are displaced due to the occurrences of the difference between the internal and external operation amounts of the bolster based on the SAB one-sided application, and the difference between the operations of the internal and external bolsters even by the body size of the passenger and the passenger's habit such as the sitting posture tilting.

For example, as in FIG. 5, the external bolster is operated more when a ratio of the operation amount of the external bolster adjustment plate 23 and the operation amount of the internal bolster adjustment plate 24 is 6:4, and as in FIG. 6, the internal bolster is operated when the ratio of the operation amount of the external bolster adjustment plate 23 and the operation amount of the internal bolster adjustment plate 24 is 4:6, causing the deviation in the operation amount.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a side bolster adjustment apparatus and system and a side bolster adjustment method for a vehicle seat configured for reducing the operation deviation between the internal and external bolsters.

A side bolster adjustment apparatus of a vehicle seat according to various aspects of the present invention includes a guide frame which is mounted to a seat back frame, and is formed with a guide groove, a slider which slides along a direction in which a bolster protrudes from a seat back, which is the longitudinal direction of the guide groove, by a guide means which is formed in the guide groove, a lead screw which is provided to penetrate the slider, and is disposed in the longitudinal direction of the guide groove, a motor which rotates the lead screw, and a bolster plate which is coupled to the slider, and rotates around a vertical longitudinal direction of the seat back by operation of the slider.

Furthermore, the lead screw is mounted to penetrate a through hole which is formed in the slider, and is screw-coupled to the through hole of the slider.

Furthermore, the lead screw rotates around a direction in which the bolster protrudes from the seat back by the motor.

Furthermore, the lead screw is rotatably coupled to a rotary support plate which is coupled to a front end portion of the guide frame with respect to a direction in which the bolster protrudes from the seat back, and is coupled to the motor by penetrating a rear end portion of the guide frame.

Furthermore, the bolster plate is coupled to the slider by a push rod, and the push rod is formed of a slider connection portion which extends along the direction in which the bolster coupled to the slider protrudes from the seat back, a curved portion which has a shape curved and extends from the slider connection portion, and a plate connection portion which extends from the curved portion to be connected to the bolster plate.

Furthermore, the rotary support plate is formed with a curved groove which is inclined at a certain angle in a rotation direction of the bolster plate with respect to the direction in which the bolster protrudes from the seat back, and the curved portion is accommodated and supported by the curved groove.

Meanwhile, the guide frame is formed with a stopper which extends along the vertical longitudinal direction of the seat back to limit the rotational radius of the push rod.

Next, a side bolster adjustment system for a vehicle seat according to various aspects of the present invention includes side bolster adjustment apparatuses each including a bolster plate which is mounted to a guide frame in each of both the bolsters of a vehicle seat, and rotates around the vertical longitudinal direction of a seat back, and a controller which controls the side bolster adjustment apparatus, and each of the side bolster adjustment apparatuses is provided with a motor which electrically connected to the controller and rotates the bolster plate.

Here, the controller is configured to individually control each motor.

Furthermore, the controller adjusts the operation amount deviation of both the motors by comparing the operation amounts of both the motors to reduce the control output of the motor of which the operation amount is determined to be excessive.

Meanwhile, each of the side bolster adjustment apparatuses includes a guide frame which is mounted to a seat back frame, and is formed with a guide groove, a slider which slides along a direction in which a bolster protrudes from a seat back, which is the longitudinal direction of the guide groove, by a guide means which is formed in the guide groove, a lead screw which is provided to penetrate the slider, and is disposed in the longitudinal direction of the guide groove, the motor which rotates the lead screw, and the bolster plate which is coupled to the slider, and rotates around a vertical longitudinal direction of the seat back by operation of the slider.

Next, a side bolster adjustment method for a vehicle seat according to various aspects of the present invention includes comparing the operation amounts of an internal motor and an external motor which are provided in internal and external bolsters of a vehicle seat back, respectively to rotate bolster plates around the vertical longitudinal direction of the seat back, comparing the operation amount deviation of the internal motor and the external motor with a predetermined deviation reference, and adjusting the operation amount deviation which reduces a control output of a motor having a large amount of operation of the internal motor and the external motor, when the operation amount deviation of the internal motor and the external motor is equal to or more than the deviation reference.

Here, the adjusting of the operation amount deviation performs a Pulse Width Modulation (PWM) control for the output of the motor having a large amount of operation equal to or more that 40% and smaller than 100%.

Furthermore, the adjusting of the operation amount deviation reduces the output of the motor having a large amount of operation by a ratio of the operation amount deviation as compared to the output of the motor having a small amount of operation.

Furthermore, the method further includes comparing the operation amounts of the internal motor and the external motor after the adjusting of the operation amount deviation, and controlling the outputs of the internal motor and the external motor to equal to each other, when the operation amounts of the internal motor and the external motor are the same.

Furthermore, as the result of comparing the operation amounts of the internal motor and the external motor after the adjusting of the operation amount deviation, when the operation amounts of the internal motor and the external motor are not the same, the comparing of the operation amount deviation of the internal motor and the external motor with the predetermined deviation reference is performed again.

According to the side bolster adjustment apparatus and the side bolster adjustment method of the vehicle seat according to an exemplary embodiment of the present invention, it is possible to reduce the operation deviation between the internal and external bolsters at the time of the bolster operation, minimizing the occurrence of the mechanical displacement and improving the support property of the bolster when the vehicle turns.

Furthermore, it is possible to adjust the bolster in interlock with the getting on or off or the AVN, improving the merchantability.

Furthermore, it is possible to control the motor output, preventing the emotional dissatisfaction caused by stopping the module during the operation as compared to the ON/OFF type control method.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

BRIEF DESCRIPTION OF THE DRAWINGS

FIG. 9A, FIG. 9B and FIG. 9C are a diagram illustrating a side bolster adjustment method according to an exemplary embodiment of the present invention.

FIG. 11 is a diagram illustrating the relationship between the operation amount of the bolster and the motor according to an exemplary embodiment of the present invention.

Figure 1:
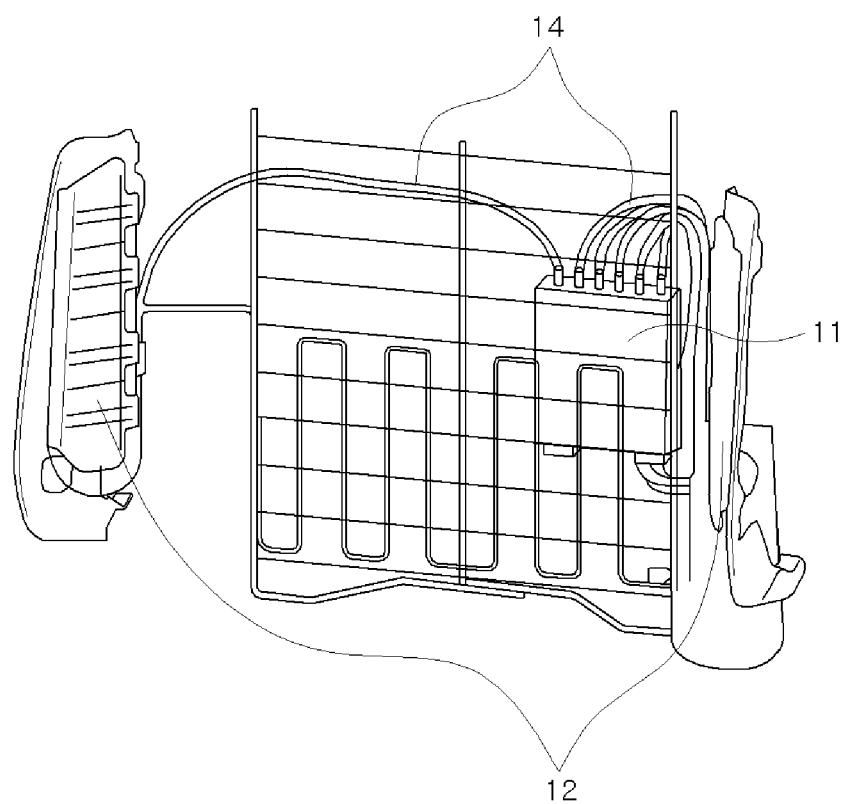
FIG. 1 is a diagram illustrating an example of a hydraulic bolster apparatus.
Figure 2:
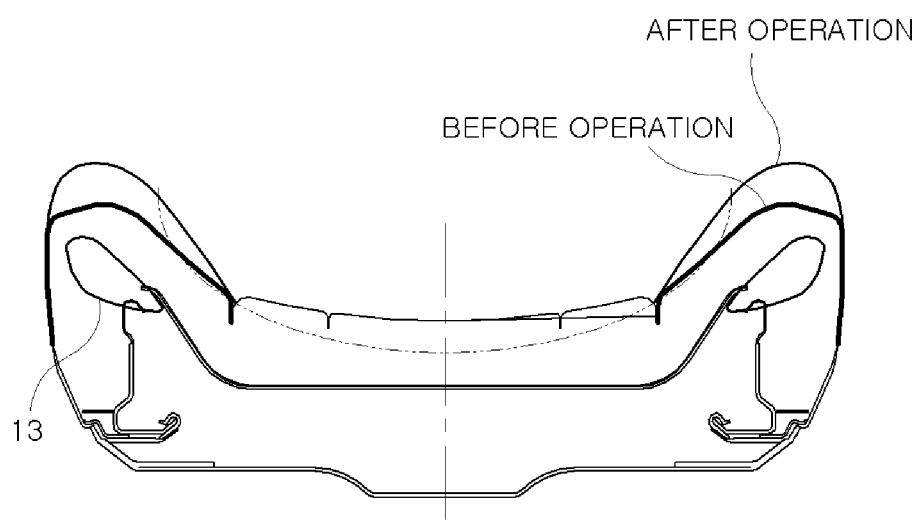
FIG. 2 is a diagram schematically illustrating a planar cross-sectional shape.
Figure 3:
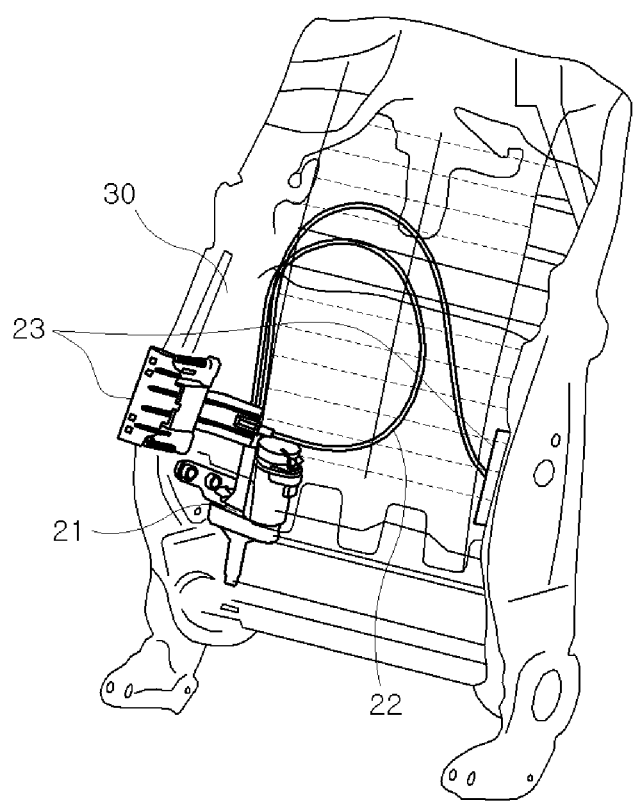
FIG. 3 is a diagram illustrating an example of a mechanical bolster apparatus.
Figure 4:
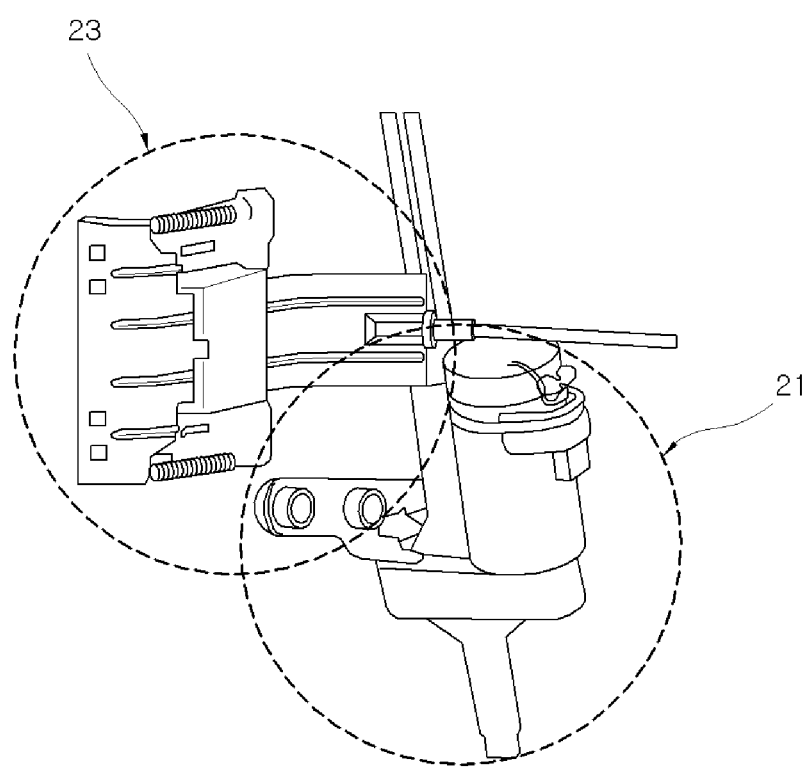
FIG. 4 is an enlarged diagram of some components.
Figure 5:
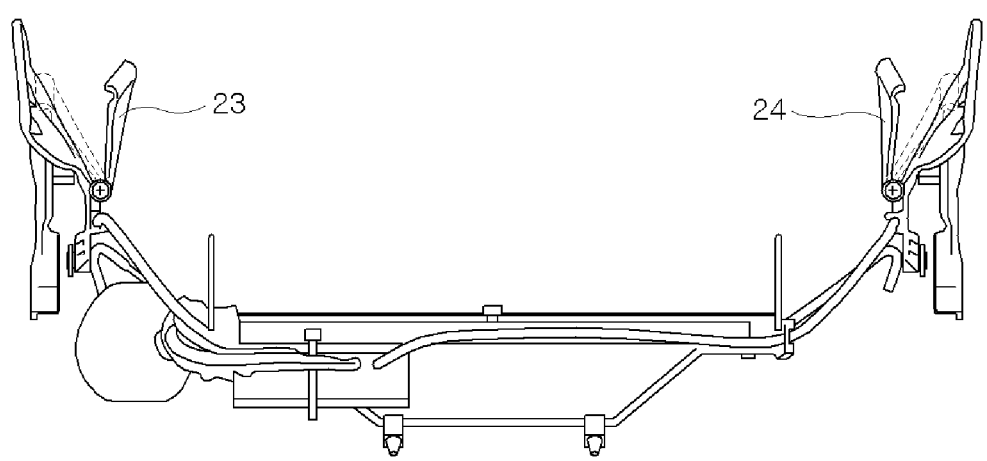
FIG. 5 and FIG. 6 are diagrams illustrating the deviation between the operation amounts by a conventional bolster apparatus.
Figure 6:
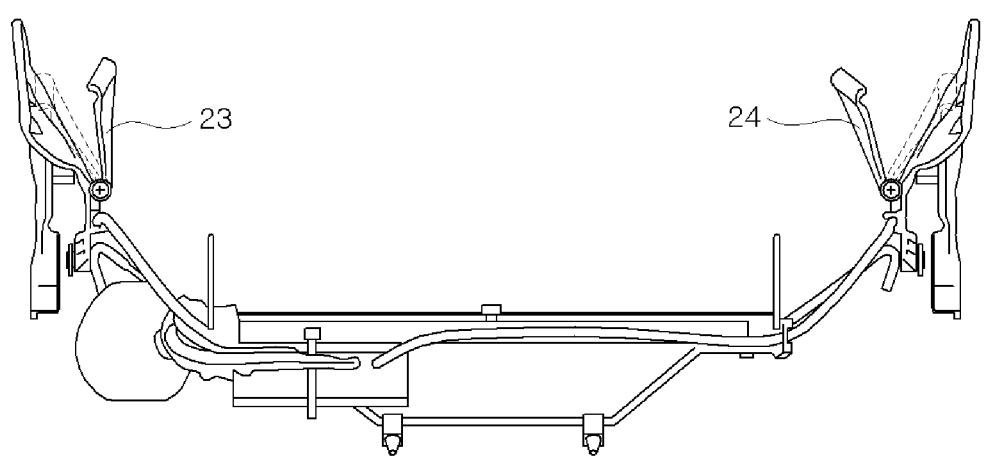

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

To fully understand the present invention, the operational advantages of the present invention, and the objects achieved by practicing the present invention, reference may be made to the accompanying drawings which illustrate exemplary embodiments of the present invention and the contents described in the accompanying drawings.

In describing the exemplary embodiments of the present invention, well-known technologies or repeated descriptions which may unnecessarily obscure the subject matter of the present invention will be shortened or omitted.

Figure 7:
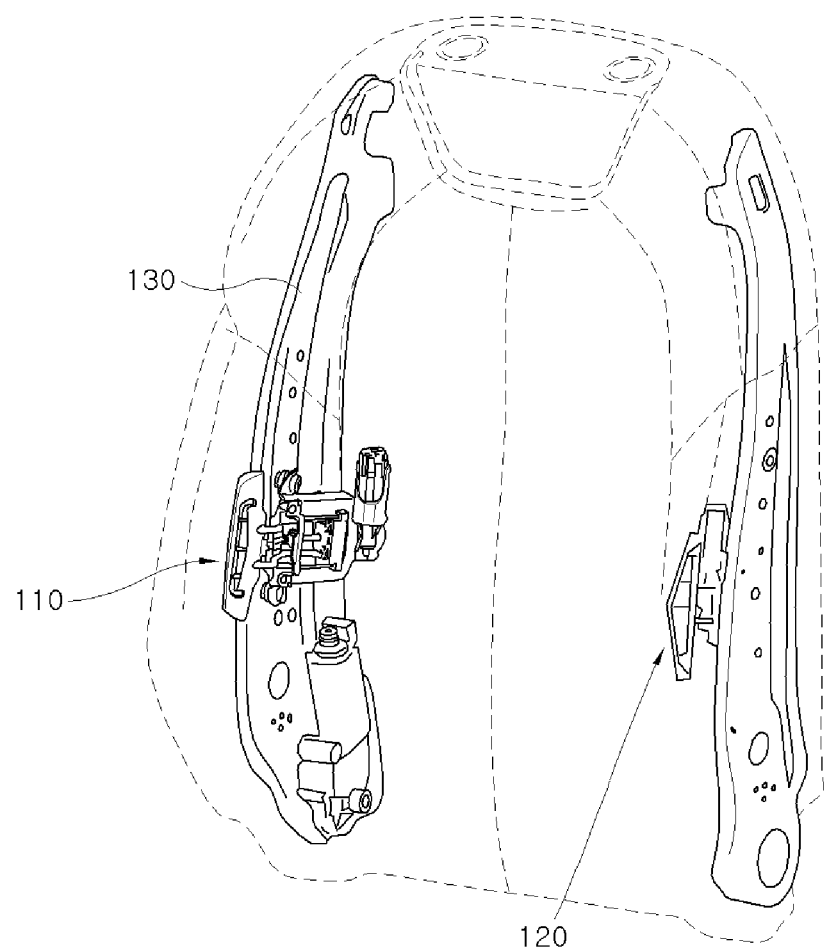
FIG. 7 is a diagram illustrating a state where the bolster adjustment apparatus according to an exemplary embodiment of the present invention is mounted.
Figure 8:
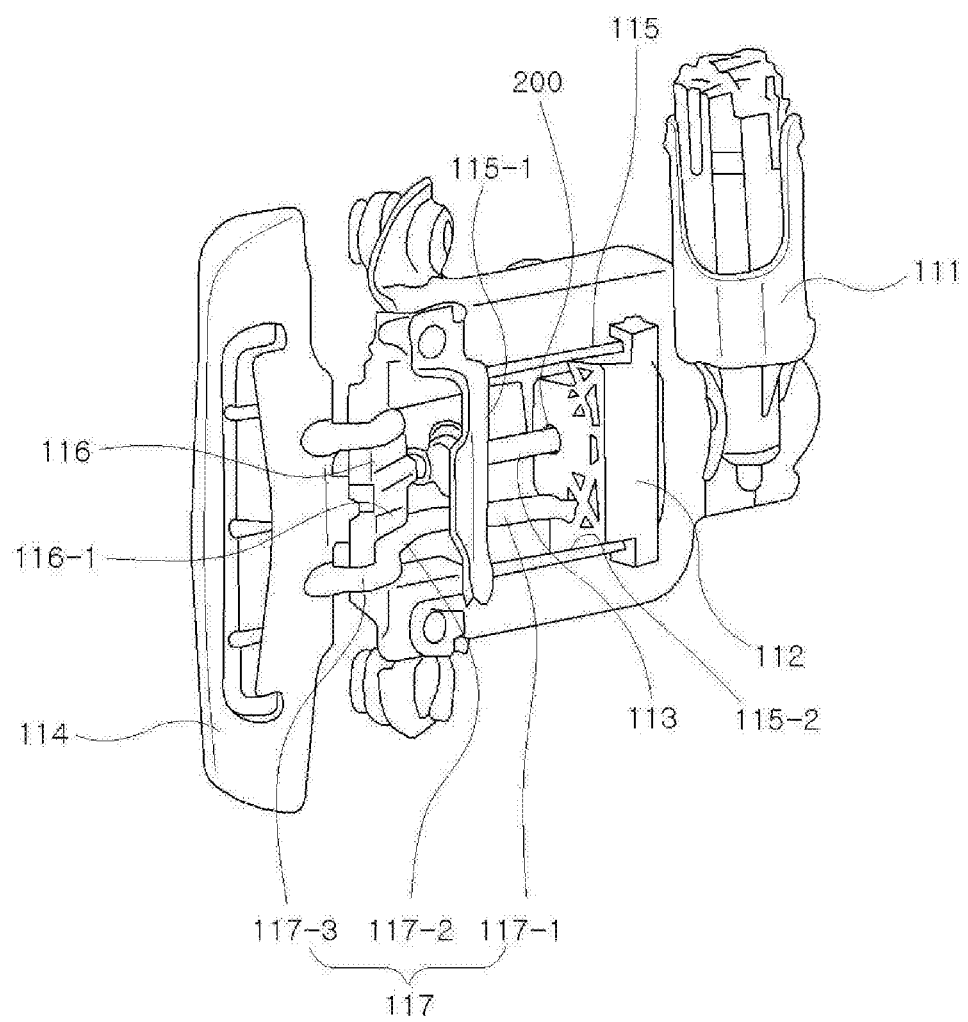
FIG. 8 is a diagram separately illustrating the bolster adjustment apparatus of FIG. 7.
Figure 9A:
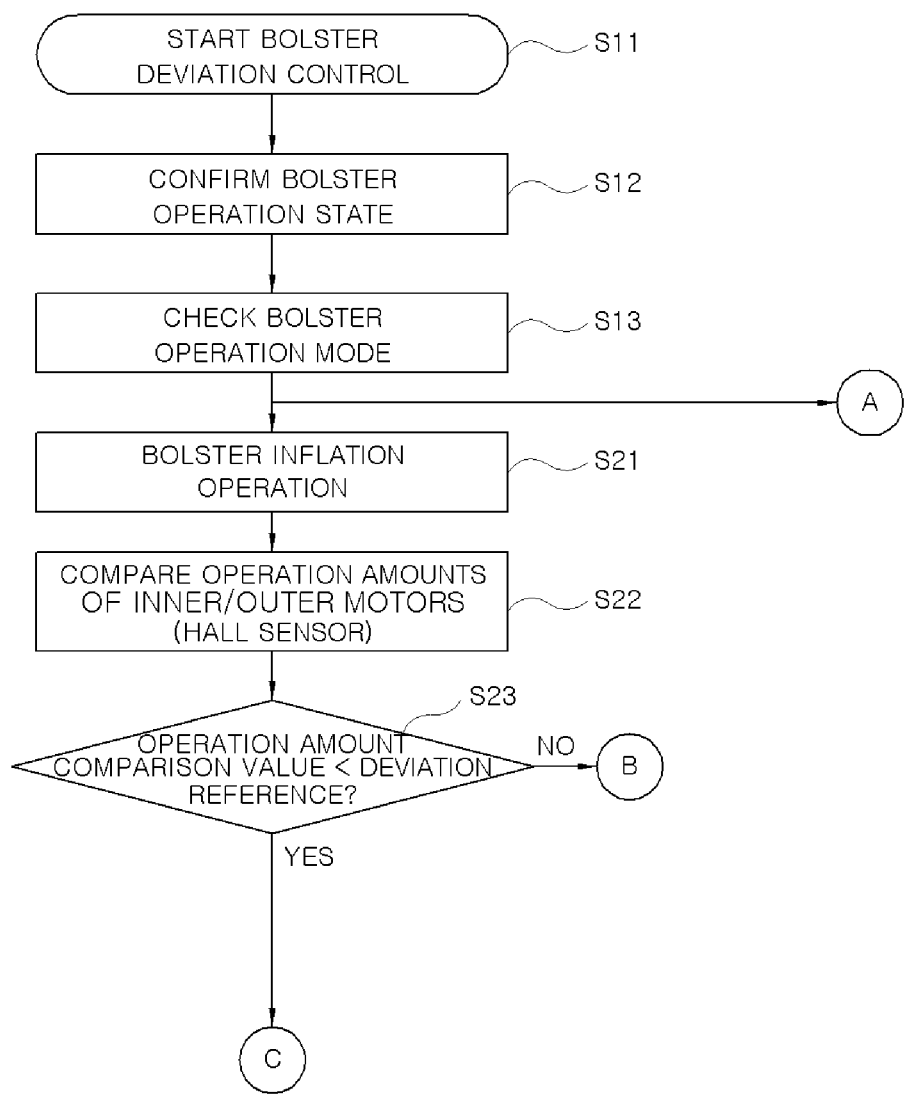
Figure 9B:
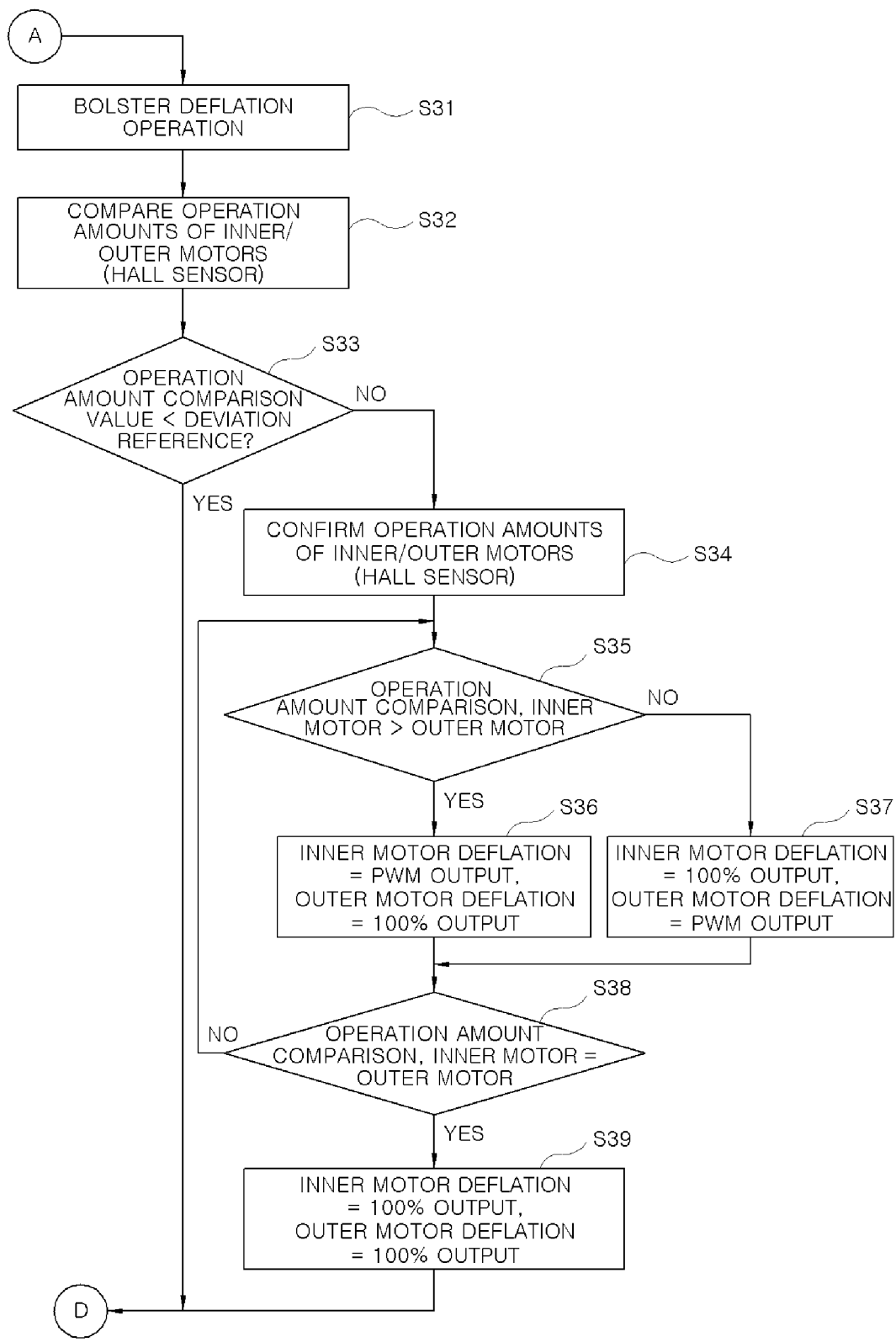

FIG. 7 is a diagram illustrating a state where the bolster adjustment apparatus according to an exemplary embodiment of the present invention is mounted; FIG. 8 is a diagram separately illustrating the bolster adjustment apparatus of FIG. 7; and FIG. 9A, FIG. 9B and FIG. 9C are a diagram illustrating a side bolster adjustment method according to an exemplary embodiment of the present invention.

Hereinafter, a side bolster adjustment apparatus and bolster adjustment method for a vehicle seat according to an exemplary embodiment of the present invention will be described with reference to FIGS. 7 to 9C.

As in FIG. 7, side bolster adjustment apparatuses 110, 120 for the vehicle seat according to an exemplary embodiment of the present invention are mechanical apparatuses which are mounted to seat back frames 130 to adjust bolsters which protrude forward from both front side portions of the vehicle seat back, and may be provided in both sides bolsters, respectively to adjust both the sides bolsters independently.

To the present end, the side bolster adjustment apparatus 110, 120 may include a guide frame 115 which is mounted to the seat back frame 130 in the bolster, a motor 111, a lead screw 113 which is rotated by the motor 111, a slider 112 which is coupled to the lead screw 113 to slide within the guide frame by the rotation of the lead screw 113, a bolster plate 114 which is rotated by the linear motion of the slider 112, and a controller which controls the operation of the motor 111 to rotate the bolster plate 114 around the vertical longitudinal direction of the seat back, adjusting the degree of the side support of the driver by the bolster.

The motor 111 is provided in each of the side bolster adjustment apparatuses 110, 120 and is configured to enable each of the side bolster adjustment apparatuses 110, 120 to be individually controlled by the controller.

The guide frame 115 is provided in a frame shape which is formed with a guide groove, and a longitudinal direction of the guide groove 115-2 is formed along a direction in which the bolster protrudes from the seat back (hereinafter, referred to as a bolster protrusion direction for convenience) to be coupled to the slider 112 by a guide means which is formed on the guide frame 115 along the guide groove.

Accordingly, the slider 112 slides along the bolster protrusion direction in the longitudinal direction of the guide groove 115-2 by the guide means.

The lead screw 113 is internally mounted within the guide groove 115-2 of the guide frame 115 in the longitudinal direction of the guide groove, and the lead screw 113 penetrates the slider 112 and the rear end portion of the guide frame 115 to be coupled to the motor 111 and is rotatably coupled to a rotation support plate 116 which is coupled to the front end portion of the guide frame 115, rotating around the bolster protrusion direction at the time of the operation of the motor 111.

Furthermore, the slider 112 includes a through hole 200, which is formed therein so that the lead screw 113 penetrates through the through hole 200, and includes a thread which is formed in the through hole 200 to be screw-coupled to the lead screw 113. Accordingly, when the lead screw 113 rotates around the bolster protrusion direction thereof, the slider 112 performs the linear motion along the bolster protrusion direction along the guide means of the guide frame 115.

The bolster plate 114 is configured in a plate shape having a vertical longitudinal direction longer than the front and rear direction thereof, and is configured to support the driver's side surface by deforming the bolster by rotating around the vertical longitudinal direction of the seat back.

The bolster plate 114 is connected to the slider 113 by a push rod 117, and a pair or more of the push rods 117 may be configured, becoming more stable.

The push rod 117 includes a slider connection portion 117-1 which extends along the bolster protrusion direction thereof, a curved portion 117-2 having a shape which is curved from the slider connection portion, and a plate connection portion 117-3 which extends from the curved portion 117-2 to be connected to the bolster plate 114.

The plate connection portion 117-3 may have a linear shape or a curved shape, and the curved portion 117-2 is accommodated on and supported by a curved groove 116-1 which is formed in the rotary support plate 116.

Furthermore, the curved groove 116-1 is formed in a curved form along the rotation direction of the bolster plate 114 with respect to the bolster protrusion direction thereof.

Accordingly, when the slider 112 moves forward to push the push rod 117, the curved portion 117-2 having the curvature corresponding to the curved groove 116-1 moves forward along the curved groove 116-1, such that the bolster plate 114 is rotated in the center direction with respect to the seat back around the vertical longitudinal direction of the seat back to be operated to support the side surface of the driver.

Furthermore, the guide frame 115 may be formed with a stopper 115-1 having a shape extending in the vertical longitudinal direction of the seat back, limiting the maximum rotation radius of the bolster plate 114.

The present invention includes the motor 111 which is provided in each of the side bolster adjustment apparatuses 110, 120 to individually control each of the side bolster adjustment apparatuses 110, 120 by the controller, reducing the location deviation of the bolsters as compared to the conventional one.

However, nevertheless, the locations of the internal bolster and the external bolster may be displaced with respect to the vehicle due to factors such as the operation deviation of both motors or the load state of the system and the load condition of the passenger.

The present invention controls the deviation to be corrected by the controller to also remove such a deviation, which will be described in the description of the adjustment method later.

Furthermore, even by a sole control of the controller, not only the deviation control between the internal and external bolsters may be performed, but also the virtual limit of the rotational operation may be set, preventing damage to the component caused by the hard stop, and at the time of an initial driving, a soft start control may be performed, reducing the impact and noise of the motor.

Meanwhile, the controller may exert a control function which is interlocked with other functions.

That is, it is possible to implement the interlocking function, increasing the passenger's convenience when getting on or off, which may be implemented so that the controller controls the motor by a signal from a door sensor, a seating sensor, or the like.

Furthermore, it is possible to increase the operation amount when changing to a sports mode, for example, in interlock with a running mode, improving the passenger's support property.

Furthermore, the controller may also be implemented to control the motor by the input through Audio, Video, Navigation (AVN).

Next, the side bolster adjustment method according to an exemplary embodiment of the present invention is a method of monitoring the internal motor of an internal side bolster adjustment apparatus and the external motor of an external side bolster adjustment apparatus to measure the location of each motor, and when a pulse deviation of a reference value or more between the motors occurs, correcting the deviation to control the location.

First, when a bolster deviation control is started (S11), it is confirmed whether the bolster operation is normal (S12), and the operation mode of the bolster is verified (S13).

The confirming of the operation mode of the bolster is to confirm whether the bolster is operated to be in an inflation state in the center direction with respect to the seat back around the vertical longitudinal direction of the seat back, or conversely, to be in a deflation state.

As the confirmation result, the bolster may be in the inflation state (S21), or the bolster may be in the deflation state (S31), and both cases equally correct the deviation between the internal and external side bolster adjustment apparatuses.

That is, first, the operation amounts of the internal motor and the external motor (hall sensor) are compared (S22, S32).

Furthermore, a compared operation amount comparison value is compared with a deviation reference (S23, S33).

Here, the operation amount is the total number of pulses of the motor at the maximum operation, and is compared with a predetermined deviation reference value.

As the comparison result, when the operation amount comparison value is smaller than the deviation reference, no deviation correction is needed, but when the operation amount comparison value is equal to or greater than the deviation reference, the operation amounts of the internal motor and the external motor (hall sensor) are confirmed for the deviation correction (S24, S34).

After confirming the operation amounts of the internal motor and the external motor, the operation amounts of the internal motor and the external motor are compared (S25, S35).

Accordingly, the output of the motor having a large amount of operation is adjusted so that the deviation is corrected.

That is, as the operation amount comparison result, when the operation amount of the internal motor is greater than the operation amount of the external motor, a Pulse Width Modulation (PWM) control is performed for the inflation or deflation control of the internal motor, and the inflation or deflation control of the external motor maintains 100% output (S26, S36).

On the other hand, as the operation amount comparison result, when the operation amount of the internal motor is not greater than the operation amount of the external motor, the PWM control is performed for the inflation or deflation control of the external motor, and the inflation or deflation control of the internal motor maintains 100% output (S27, S37).

As described above, by adjusting the output of the motor having a large amount of operation under the PWM control to 40% or more and smaller than 100%, it is possible to remove the deviation between the internal and external bolsters.

The output adjustment by the PWM is to lower the speed by reducing the deviation occurring between the internal and external motors to a half ratio. To reduce the output of the motor having a large amount of operation, the output adjustment by the PWM is to determine the ratio of the deviation between the output of the motor having a large amount of operation and the output of the motor having a small amount of operation based on the output of the motor having a large amount of operation, and to control the output of the motor having a large amount of operation by the ratio thereof as compared to the motor of the 100% output having a small amount of operation.

That is, for example, when an operation amount deviation occurs with the internal operation amount of 40 mm and the external operation amount of 50 mm, the motor output is reduced by the deviation ratio by setting the internal operation amount to 100% and the external operation amount to 80%. Accordingly, the internal bolster operation speed becomes 5 mm/s, and the external bolster operation speed becomes 4 mm/s, such that the locations of the internal and external bolsters return to the basic locations.

Subsequently, when the outputs of the internal and external motors are equally controlled to 100%, the maximum operation amounts of the internal and external bolsters become 50 mm equally.

After adjusting the output of the motor having a large amount of operation as described above, the operation amount is compared again (S28, S38).

As the comparison result, when the operation amounts of the internal motor and the external motor are the same, the outputs for the inflation or deflation controls of the internal and external motors are adjusted to 100% (S29, S39), and if not the same, the operation amounts of the internal and external motors are compared by the S25, S35 again to control the deviation to be corrected. At the instant time, whether the operation amounts of the internal and external motors are the same or whether the locations are completely corrected by the hall sensor of the motors may be determined.

FIG. 10A, FIG. 10B, FIG. 10C, FIG. 10D, FIG. 10E and FIG. 10F sequentially illustrate operating states of the bolster adjustment apparatus according to an exemplary embodiment of the present invention based on the side bolster adjustment method described above.

Figure 10A:
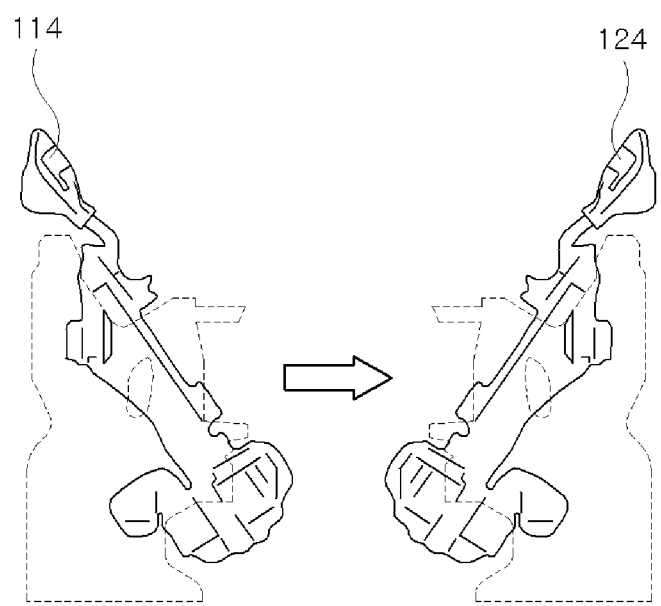
FIG. 10A, FIG. 10B, FIG. 10C, FIG. 10D, FIG. 10E and FIG. 10F are diagrams illustrating operating states of the bolster adjustment apparatus according to an exemplary embodiment of the present invention sequentially.
Figure 10B:
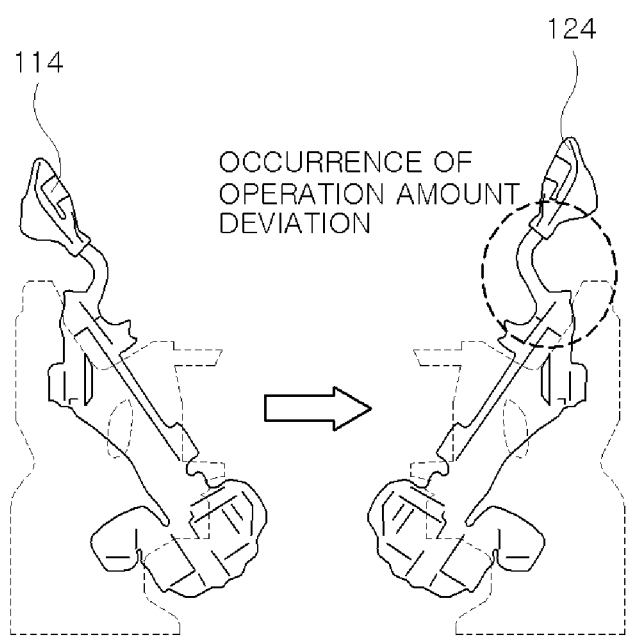

That is, as in FIG. 10B, the operation amount deviation in which the operation amount of the external bolster is greater than the operation amount of the internal bolster occurs by the bolster operation at the initial location as in FIG. 10A. Here, the bolster plates (114-inner, 124-outer) will be described instead to explain the operation amount of the bolster.

Figure 10C:
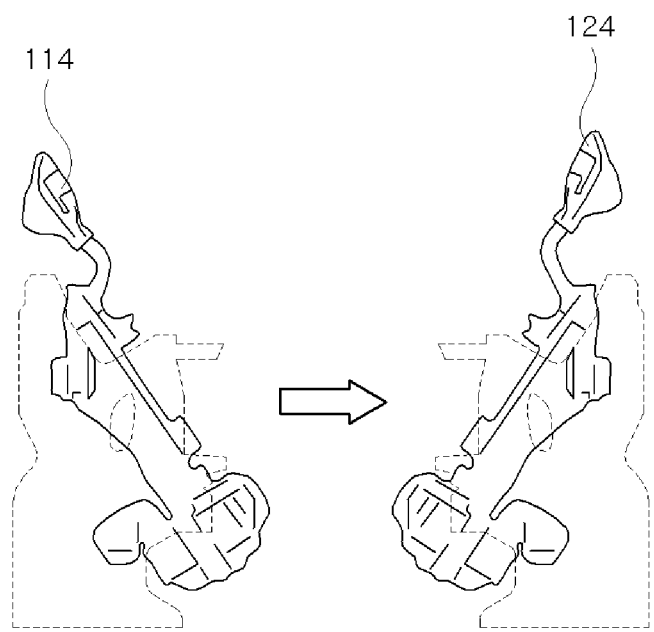
Figure 10D:
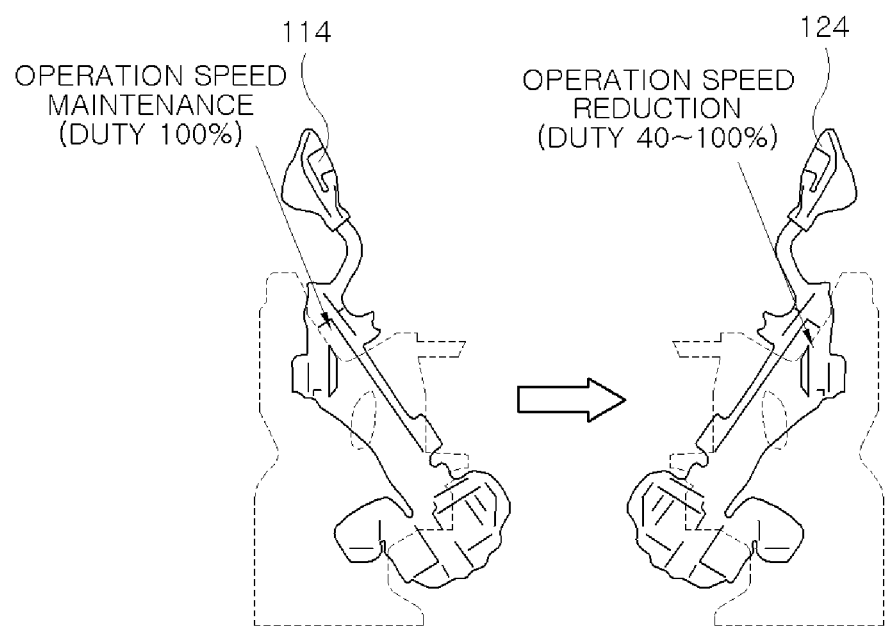

Accordingly, as in FIG. 10C, the internal and external operation amounts are determined by the S25; as in FIG. 10D, the operation speed of the internal bolster plate 114 is maintained to 100% by the S27; and the operation speed of the external bolster plate 124 is duty-controlled.

Figure 10E:
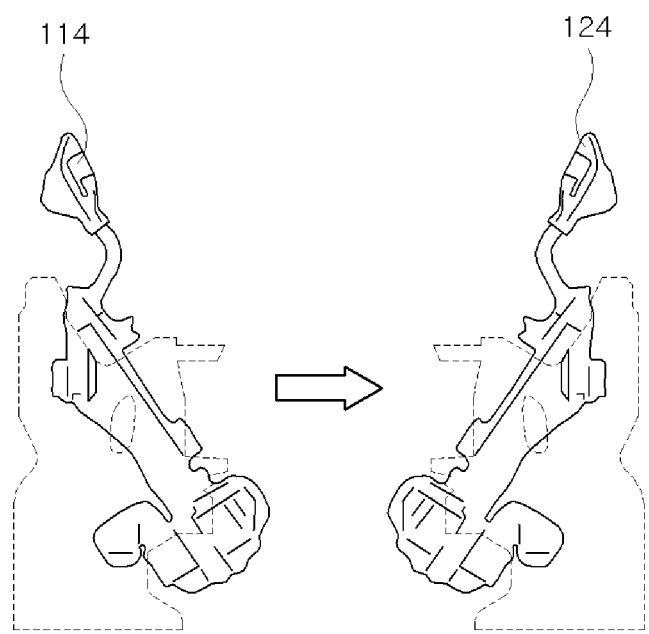
Figure 10F:
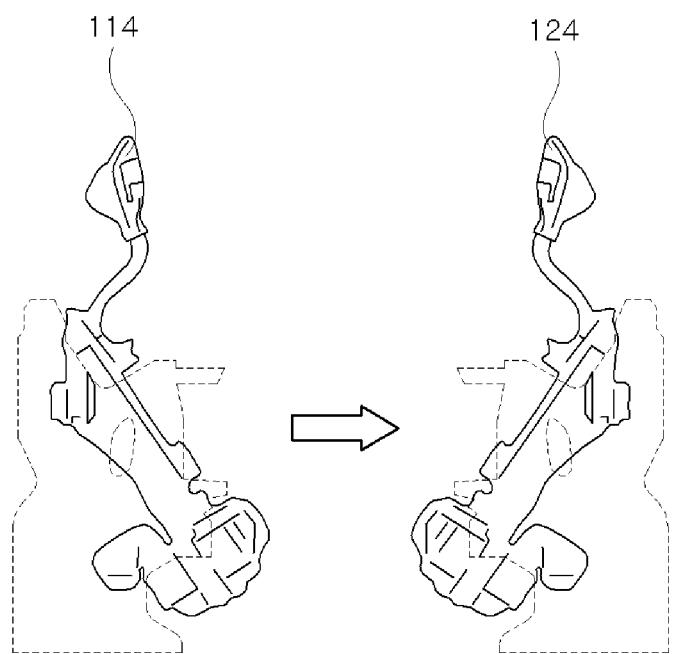

After such deviation adjustment, as in FIG. 10E, whether the deviation correction is performed is confirmed by the S28, and as in FIG. 10F, the internal bolster plate and the external bolster plate are equally operated 100% by the S29.

FIG. 11 is a diagram illustrating the output of the motor based on the control of the present invention, and as illustrated, the PWM control for the output of the motor is performed when the deviation occurs (2) in a state in which the motor is operated in the 100% output section through the initial driving section (1), and then when the deviation is removed, the output of the motor is controlled to 100% again (3).

As described above, according to the side bolster adjustment apparatus and method according to an exemplary embodiment of the present invention, the bolster motors are provided at the internal and external portions, respectively to be independently controllable, and the internal and external operation deviation is corrected by such an independent control, minimizing the occurrence of the mechanism displacement, and preventing the emotional dissatisfaction caused by stopping the module during the operation as compared to the ON/OFF type control method.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A side bolster adjustment apparatus of a seat, the apparatus comprising:
    a guide frame which is mounted to a seat back frame, and is formed with a guide groove;
    a slider which slides along a direction in which a bolster protrudes from a seat back, which is a longitudinal direction of the guide groove, by a guide means formed in the guide groove;
    a lead screw which is provided to penetrate the slider, and is mounted in the longitudinal direction of the guide groove;
    a motor which is coupled to the lead screw and selectively rotate the lead screw; and
    a bolster plate which is coupled to the slider, and rotates around a vertical longitudinal direction of the seat back by operation of the slider,
    wherein the lead screw is mounted to penetrate a through hole formed in the slider, and is screw-coupled to the through hole of the slider, and
    wherein the lead screw is rotatably coupled to a rotary support plate which is coupled to a front end portion of the guide frame with respect to a direction in which the bolster protrudes from the seat back, and is coupled to the motor by penetrating a rear end portion of the guide frame.

2. The side bolster adjustment apparatus of the seat of claim 1,
    wherein the lead screw rotates around a direction in which the bolster protrudes from the seat back by the motor.

3. The side bolster adjustment apparatus of the seat of claim 1,
    wherein the bolster plate is coupled to the slider by a push rod, and
    wherein the push rod includes a slider connection portion which extends along the direction in which the bolster coupled to the slider protrudes from the seat back;
    a curved portion which is curved and extends from the slider connection portion; and
    a plate connection portion which extends from the curved portion to be connected to the bolster plate.

4. The side bolster adjustment apparatus of the seat of claim 3,
    wherein the rotary support plate is formed with a curved groove which is inclined at a predetermined angle in a rotation direction of the bolster plate with respect to the direction in which the bolster protrudes from the seat back, and wherein the curved portion is accommodated and supported by the curved groove.

5. The side bolster adjustment apparatus of the seat of claim 3, wherein the guide frame is formed with a stopper which extends along the vertical longitudinal direction of the seat back to limit a rotational radius of the push rod.

6. The side bolster adjustment apparatus of the seat of claim 1, further including a controller which is electrically connected to the motor, wherein the controller is configured to selectively rotate the motor.

7. A side bolster adjustment system of a seat, the system including:

side bolster adjustment apparatuses each including a bolster plate which is mounted to a guide frame in each of bolsters of the seat, and rotates around a vertical longitudinal direction of a seat back; and a controller which is engaged to the side bolster adjustment apparatuses and configured to control the side bolster adjustment apparatuses, wherein the side bolster adjustment apparatuses are provided with motors which are electrically connected to the controller and rotates the bolster plate, wherein the controller is configured to individually control each motor, and wherein the controller is configured to adjust an operation amount deviation of each motor by comparing operation amounts of each motor to reduce a control output of a motor of the motors, in which an operation amount of the motor is determined to be equal to or more than a predetermined amount.

8. The side bolster adjustment system of the seat of claim 7, wherein each of the side bolster adjustment apparatuses includes:

the guide frame which is mounted to a seat back frame, and is formed with a guide groove;

a slider which slides along a direction in which a bolster protrudes from the seat back, which is a longitudinal direction of the guide groove, by a guide means formed in the guide groove;

a lead screw which is provided to penetrate the slider, and is mounted in a longitudinal direction of the guide groove;

each motor which rotates the lead screw; and the bolster plate which is coupled to the slider, and rotates around the vertical longitudinal direction of the seat back by operation of the slider.

9. A bolster adjustment method of a seat, the method comprising:

comparing, by a controller connected to an internal motor and an external motor, operation amounts of the internal motor and the external motor which are provided in internal and external bolsters of a seat back, respectively to rotate bolster plates around a vertical longitudinal direction of the seat back;

comparing, by the controller, operation amount deviation of the internal motor and the external motor with a predetermined deviation reference; and adjusting, by the controller, the operation amount deviation which reduces a control output of one motor of a larger amount of operation among the internal and external motors when the operation amount deviation of the internal motor and the external motor is equal to or more than the predetermined deviation reference.

10. The method of claim 9, wherein the adjusting of the operation amount deviation performs a Pulse Width Modulation (PWM) control for an output of one motor having the amount of operation equal to or more that 40% and smaller than 100% among the internal and external motors.

11. The method of claim 10, wherein the adjusting of the operation amount deviation reduces an output of a motor among the internal and external motors, which has a first amount of operation by a ratio of the operation amount deviation as compared to an output of a motor having a second amount of operation among the internal and external motors, the first amount of operation being greater than the second amount of operation.

12. The method of claim 9, further including:

comparing, by the controller, the operation amounts of the internal motor and the external motor after the adjusting of the operation amount deviation; and equally controlling outputs of the internal motor and the external motor, when the operation amounts of the internal motor and the external motor are a same.

13. The method of claim 12, wherein as a result of comparing the operation amounts of the internal motor and the external motor after the adjusting of the operation amount deviation, when the operation amounts of the internal motor and the external motor are not a same, the comparing of the operation amount deviation of the internal motor and the external motor with the predetermined deviation reference is performed again.

14. The method of claim 9, wherein a first guide frame is mounted to a seat back frame, and is formed with a first guide groove;

a first slider slides along a direction in which a first bolster protrudes from the seat back, which is a longitudinal direction of the first guide groove, by a first guide means formed in the first guide groove;

a first lead screw is provided to penetrate the first slider, and is mounted in a longitudinal direction of the first guide groove;

the external motor is coupled to the first lead screw and selectively rotate the first lead screw; and a first bolster plate is coupled to the first slider, and rotates around a vertical longitudinal direction of the seat back by operation of the first slider.

15. The method of claim 9, wherein a second guide frame is mounted to a seat back frame, and is formed with a second guide groove;

a second slider slides along a direction in which a second bolster protrudes from the seat back, which is a longitudinal direction of the guide groove, by a second guide means formed in the second guide groove;

a second lead screw is provided to penetrate the second slider, and is mounted in a longitudinal direction of the second guide groove;

the internal motor is coupled to the second lead screw and selectively rotate the second lead screw; and a second bolster plate is coupled to the second slider, and rotates around a vertical longitudinal direction of the seat back by operation of the second slider.

* * * * *